Jan. 1, 1952 J. L. SOLOMON 2,580,967
ELECTRONIC TIMING CIRCUIT
Original Filed June 22, 1948
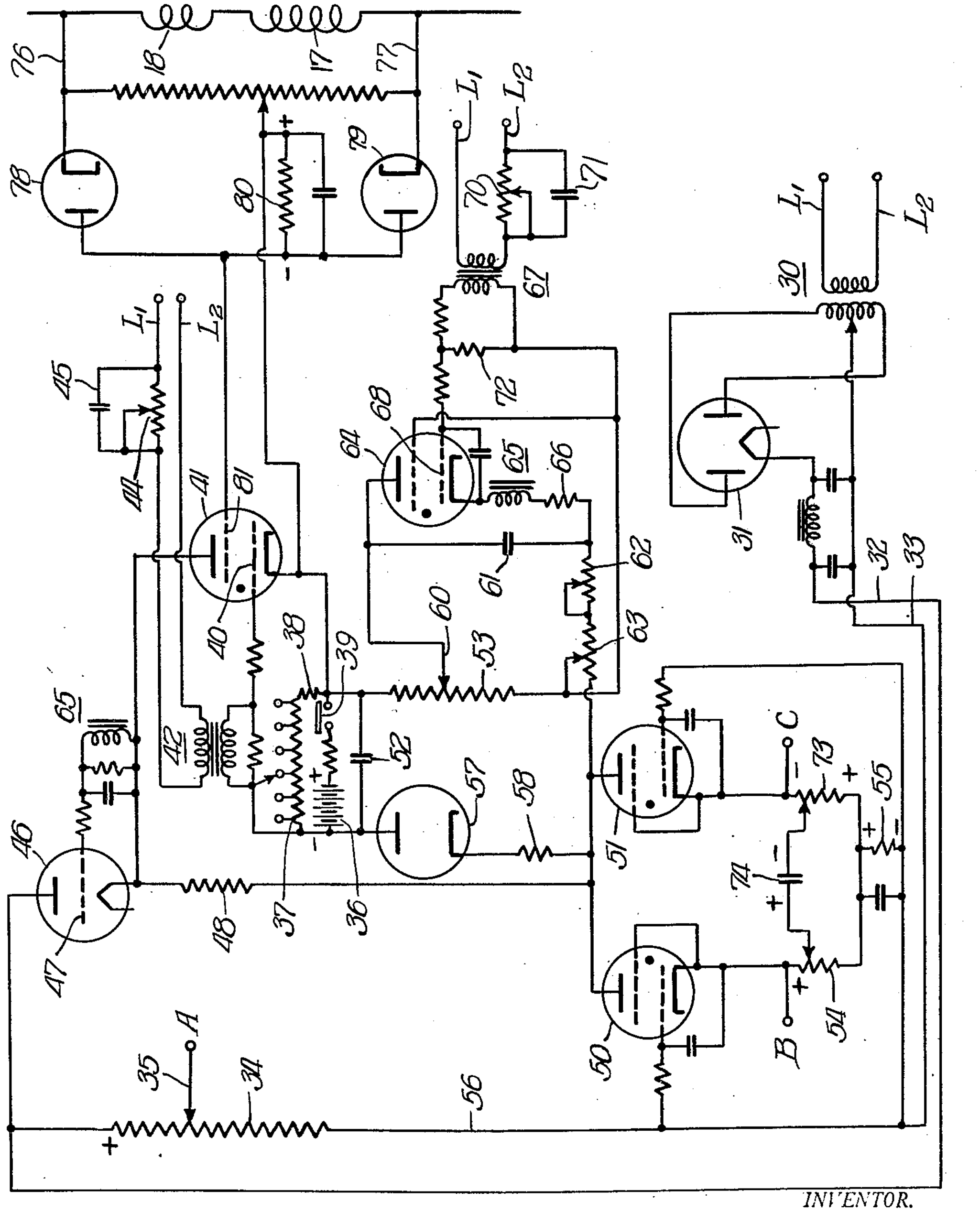
INVENTOR.
Julius L. Solomon,
BY
Wilkinson Huxley Byron & Hume
Attys.

Patented Jan. 1, 1952

2,580,967

UNITED STATES PATENT OFFICE 2,580,967

ELECTRONIC TIMING CIRCUIT

Julius L. Solomon, Chicago, Ill., assignor to Welding Research, Inc., Chicago, Ill., a corporation of Illinois Original application June 22, 1948, Serial No. 34,538. Divided and this application October 29, 1948, Serial No. 57,314

3 Claims. (Cl. 250—27)

The invention relates to timing devices and has reference more particularly to an electronic timing circuit for successively performing a cycle of timing operations for controlling the supply of current to electric apparatus such as the welding circuit disclosed in the Sciaky Patent No. 2,431,083, granted November 18, 1947.

An object of the invention is to provide an improved electronic timing circuit for use in energizing a welding circuit or the like by supplying current thereto during predetermined intervals in controlled amounts and wherein the off-time between energizations can be varied within limits.

Another object of the invention is to provide an improved timer of the fully electronic type incorporating electric valves for controlling the potential of certain grid circuits connecting with the valves, said control being effected by the magnitude of the current caused to flow through the valves, and wherein the valves are rendered conductive in an alternate manner so that the potential of the grid circuits with respect to a cathode terminal is alternately negative and positive.

More particularly an object of the invention is to provide an electronic timing circuit for successively performing a cycle of timing operations, and wherein the circuit includes a pair of electric valves alternately rendered conductive and non-conductive for predetermined intervals so as to control, by current flow through the valves, the potential of certain grid circuits having connection therewith.

Another object resides in the provision of a timer circuit having a pair of electric valves alternately conductive and non-conductive and wherein the on and off-time periods for said valves may be adjusted within limits by controlling the charging and discharging rates of capacitors, one constituting the off-time capacitor and the other the on-time capacitor.

Another object of the invention is to provide a fully electronic timing circuit incorporating a pair of electric valves which are alternately conductive with only one valve conducting at a time, and wherein the switch from one valve to the other is automatic.

Another object is to provide an electronic timing circuit of the character described which will incorporate phase shifting means for presetting the instants in the half cycle periods of the source during which the electric valves are rendered conductive so that the electric energy supplied to the welding circuit for each energization can be regulated as to amount for obtaining the desired heat control.

A further object is to provide an improved timing circuit for controlling the firing of respective groups of electric discharge valves and which circuit will be relatively simple in construction, embodying few parts but positive and efficient in operation.

With these and various other objects in view the invention may consist of certain novel features of construction and operation as will be more fully described and particularly pointed out in the specification, drawing and claims appended hereto.

In the drawing, the figure is a schematic wiring diagram illustrating a fully electronic timing circuit coming within the invention.

The transformer 30 is electrically connected on its input side to a source of alternating current indicated by leads $L_1$ and $L_2$. On its output side the transformer 30 connects with a full wave rectifier 31 which supplies direct current through the leads 32 and 33 to the voltage divider indicated by numeral 34, the same being connected by the conductor 35 to the common cathode point A and which connection can be adjusted in order that the potential applied to point A can be made sufficiently positive to secure the desired mode of operation. A battery 36 or other suitable source of direct current is connected across the resistance 37, provided with a plurality of adjustable taps, and across the resistance 38 in series therewith. The initiating contact 39 is located in series with the battery 36. The negative end of the battery is connected to the grid 40 of the gas filled, grid controlled tube 41 and accordingly the said tube is maintained in a non-conductive state when the contact 39 is closed. In the grid cathode circuit of the tube 41 there is also applied peak voltages from the secondary of the peaking transformer 42 connected by conductors 43 to a source of alternating current indicated by leads $L_1$ and $L_2$. A phase shifting circuit including a potentiometer 44 and the condenser 45 is connected with one of said conductors.

In operation of the circuit it will be seen that current will flow from the positive end of resistance 34 through the vacuum tube 46 having the control grid 47, through the resistance 48 in the cathode circuit of said tube and then through either the gas filled, grid controlled tube 50 or 51, depending on which tube is conducting since only one tube can conduct at the same time. Assuming that the tube 50 has been conducting and the initiating contact 39 is opened, the condenser 52, which was charged to the voltage appearing across the battery 36, starts to discharge through the resistances 37 and 38. One of the positive peaks generated by peaking transformer 42 will presently bring the grid of tube 41 sufficiently positive so that the tube will become conductive. Current will now take a second path from the cathode of tube 46, namely, through the plate to cathode of tube 41, through resistance 53, through 50, plate to cathode of the same, through resistance 54, through resistance 55, to the negative end of the resistance 34 by means of conductor 56.

A third path for current flow from the cathode of tube 46 will be through tube 41, plate to cathode, through the parallel circuit including the resistances 37, 38 and the condenser 52, through the vacuum tube 57, plate to cathode, through the resistance 58, tube 50, resistances 54 and 55, to the negative end of resistance 34 by means of conductor 56. A fourth path for said current flow will be from the cathode of tube 41 through a portion of the resistance 53 to the slider 60 connecting therewith, through the condenser 61, through adjustable resistances 62 and 63, through tube 50, resistances 54 and 55 to conductor 56, and returning to the negative end of 34.

The additional current flowing through 54 increases the voltage drop across this resistance and makes the grid point B connecting therewith more positive than it was in the quiescent state. During passage of this current point B is brought to the same potential as point A, whereas point C remains substantially at the same negative potential with respect to point A as it was during the quiescent state. As the condenser 61 charges by current flowing through the resistances 63 and 62 the voltage across this condenser rises exponentially, at the same time the voltage across the resistances 62 and 63 is dropping exponentially.

In examining the grid-cathode circuit of the gas filled grid controlled tube 64 we find the cathode circuit includes the primary winding of a transformer 65 and a resistance 66 in series with resistances 62 and 63. A peaking transformer 67 is also electrically connected with the control grid 68 of said tube 64, the peaking transformer having electrical connection with the leads $L_1$ and $L_2$ of a source of alternating current. The potentiometer 70 and the condenser 71 represent a phase shift circuit in series relation with the power input circuit of the peaking transformer 67. The voltages of the grid-cathode of tube 64 are therefore the voltages across 62 and 63, the negative end of which is connected to the grid 68, and the peaked voltage across resistance 72. As the condenser 61 charges, the voltage from plate to cathode rises and at the same time the voltage between cathode and grid is becoming less negative. A point is finally reached at which one of the peak voltages will cause the tube 64 to conduct. The tube will discharge the condenser 61 through resistance 66 and the primary of transformer 65. This discharge current generates a pulse voltage in the secondary of transformer 65 located in the grid-cathode circuit of tube 46. The grid 47 of this tube is driven highly negative, thus stopping the flow of current through the tube and through the rest of the circuit momentarily.

When the pulse, which is a few micro seconds in duration, is over, tube 46 becomes conductive again and current flows through 48, through tube 51, through resistances 73 and 55 to the negative side of 34. The switch from tube 50 to 51 is effected in this manner. While tube 50 is conducting the condenser 74 is charged to the voltage drop across 54 with polarities as indicated, the positive end to the cathode of tube 50 and the negative end to the cathode of tube 51. The voltage drop across 55 maintains the grid of tube 51 negative with respect to its cathode. At the instance the negative pulse is received by the grid of tube 46 and current ceases to flow, the condenser 74 starts to discharge through variable resistors 54 and 73 with instantaneous polarities as indicated. The terminal of 54 connected to the cathode of 50 is positive. The end connected to the grid of 50 is negative. Therefore the voltage between cathode and grid is the sum of the voltage across 54 and 55 with the negative connected to the grid. This prevents tube 50 from conducting.

The voltages in the grid-cathode circuit of tube 51 are as follows: From the cathode of tube 51 to the negative end of the voltage drop across 73, the positive end of 73 being connected to the positive end of 55 with the negative end being connected to the grid of tube 51. Since the voltage drop across 73 is greater than that across 55 the net voltage between grid and cathode of tube 51 will be the difference between these two voltages, with the grid now being positive with respect to the cathode. When tube 46 becomes conductive again after the pulse is passed, the tube 51 conducts the current and tube 150 is maintained non-conducting.

After condenser 61 has discharged through tube 64, the tube 41 is held non-conductive by virtue of the charge on condenser 52 which holds the grid tube 41 negative with respect to its cathode. The condenser 52 is discharged at an exponential rate by resistances 37 and 37 in series. As the voltage across 52 drops off, a point will finally be reached at which one of the peaks from peaking transformer 42 will make tube 41 conductive and it will cause current to flow along the paths previously described.

During the time condenser 61 is charging, the potential difference between points A and C will be zero but the potential between points A and B will remain substantially the same as for the off-time period, thus keeping the firing valves which are controlled by the grids to which point B is connected in the nonconducting state, whereas those valves whose grids are connected to point C are made conductive. After the on-time period which is regulated by adjustment of 62 and 63, the condenser 61 discharges and point C is again brought to a high negative potential with respect to point A, thus making both groups of firing valves non-conductive. This condition remains until condenser 52 discharges through 37, the off-time adjustment potentiometer.

The position of the peaked secondary voltage across the winding of transformer 42 may be shifted with respect to the line voltage wave by adjustment of 55 in the phase shifting network connected to this transformer. This provides adjustment of the point at which the firing starts. The position of the peak in the secondary of transformer 67 may be adjusted by varying 70 in the phase shifting network connected to this transformer. Both peaks may be shifted independently or may be adjusted from one phase shift network simultaneously.

In order to prevent the re-ignition of tube 41 before the current through the windings of a welding transformer, controlled by the timing circuit, has entirely disappeared, the invention provides a protective circuit, as shown in the drawing, in electrical connection with the timing circuit of said figure. The conductors 76 and 77 are connected across a part of a primary winding of the welding transformer such as the coils 17 and 18. While current is flowing through these coils, the voltage across the same is rectified by tubes 78 and 79 producing a voltage drop across resistance 80 which will have the polarity as indicated. The negative end of this resistor is connected to grid 81 of tube 41 and thus the peak voltages from the transformer 42 are prevented from firing tube 41 until the voltage disappears entirely across the resistance 80. As soon as this voltage disappears, the next positive pulse of the peaking transformer 42 will fire the tube 41, provided the condenser 52 has sufficiently discharged to allow the circuit to function in the manner previously described.

As a summary of the present timing circuit it can be pointed out that operation is initiated by opening the contact 39. Current flows through the single path including the resistance 48 and will continue to flow only through this one path until condenser 52 discharges sufficiently to cause tube 41 to fire. Current then flows through a plurality of paths and the firing of 41 starts the on-time period. During this period both condensers 52 and 61 are charged, the charging of 52 taking place rapidly and the charging of 61 depending on the adjustment of 62 and 63. When 61 discharges by the firing of tube 64 it ends the on-time period. With the end of the period current flow is stopped which results in switching from tube 50 to 51 or vice versa. The off-time period then begins and current flows through the single path again, the period being determined by the discharging of condenser 52. By adjusting the taps on resistance 37 this off-time period can be varied.

In analyzing the present circuit it will be seen that the resistor 34 is connected across the source of direct current and that cathode terminal A connecting therewith is adjustable for obtaining the desired positive potential. A control circuit is also connected across the source of direct current in parallel relation with resistor 34, the said circuit including the normally conductive valve 46, resistor 48 and valves 50 and 51 which are connected in parallel with each other through their cathode circuits. The current flowing through this path is materially limited by reason of the resistor 48. However, the timing device includes an auxiliary circuit which by-passes resistor 48, the said auxiliary circuit including the start valve 41 and the stop valve 64 together with their associated condensers and peaking transformers. When this auxiliary circuit is conducting a much greater amount of current is permitted to flow through either valve 50 or 51, whichever is conducting at the time, and accordingly, the potential of one of the grid terminals, either B or C, is caused to change from negative to positive with respect to the cathode terminal A. Since the switch from valve 50 to 51, or vice versa, is entirely automatic the present timing circuit will control the firing of independent groups of ignitrons and which are caused to fire in an alternate manner with controlled on and off-time periods.

This application is a divisional of my copending application Serial No. 34,538, filed June 22, 1948 and entitled Sequence Control Circuit and Timer.

It is to be understood that many other uses and applications of the invention will be apparent to those skilled in the art and it is not desired that this invention be limited to the details described for its scope includes all forms or improvements as come within the spirit of the following claims construed as broadly as the prior art will permit.

What is claimed is:

1. In a timing and control device of the character described for controlling the potential between a first terminal and second terminals respectively, the combination with a source of direct current of a potentiometer connected across said direct current source and having said first terminal adjustably connected thereto, a control circuit also connected across said direct current source including a normally conductive valve and a current limiting resistor in series with a parallel circuit comprising a pair of electric valves in parallel relation and adapted to be alternately conductive, said valves being of the gas filled type and each having an anode, a cathode and a grid, a resistor in the cathode circuit of each valve, a common resistor in the cathode-grid circuits of said valves, a capacitor joining the cathode circuits and having adjustable connection with the resistor in each cathode circuit, said capacitor and resistors permitting conductivity of only one valve at a time to pass current in said control circuit since the charging of the capacitor by said current flow together with the voltage drop across the resistors applies a negative potential to the grid of both valves thus maintaining the non-conductive valve in a non-conductive state, and said capacitor and resistors effecting a switch in the conductivity of the valves when the flow of current in the control circuit is momentarily interrupted since the discharging of the capacitor together with the voltage drop across the resistors due to said flow of discharging current applies a negative potential to the grid of the valve that was conducting and a positive potential to the grid of the valve that was non-conductive, said second terminals having electrical connection respectively with the cathode circuits at a point between the cathode and the resistor in each circuit, an auxiliary circuit in shunt relation with the current limiting resistor for bypassing the said resistor to increase current flow through the conductive valve of said pair of valves, said auxiliary circuit including a start valve and a stop valve, and said stop valve when rendered conductive momentarily rendering the normally conductive valve non-conductive to interrupt current flow in said control circuit.

2. A timing and control device as defined by claim 1, additionally including capacitor means having electrical connection with the start valve, other capacitor means having electrical connection with the stop valve, and wherein the capacitor means for the start valve controls the conductivity thereof by its rate of discharge, and wherein the other capacitor means for the stop valve controls the conductivity thereof by its rate of charge.

3. In a timing and control circuit for controlling the potentials between a first terminal and second terminals respectively, a potentiometer connected across a source of direct current and having the first terminal adjustably connected thereto, a control circuit also connected across said direct current source in parallel with the potentiometer and including a current limiting resistor in series with a parallel circuit including a pair of electric valves each having an anode, a cathode and a grid, means in the cathode circuits of said valves and in the cathode-grid circuits thereof for controlling the conductivity of said pair of valves, whereby only one valve is conductive at a time and whereby a switch is effected in the conductivity of the valves when flow of current in the control circuit is momentarily interrupted, said second terminals having electrical connection with the cathode circuits of the electric valves respectively, and means for increasing current flow through the conductive valve of said pair of valves to change the potential of the second terminal thereof with respect to the first terminal including an auxiliary circuit in shunt relation with the current limiting resistor for bypassing said resistor, a start valve and a stop valve included in said auxiliary circuit, capacitor means respectively for controlling the conductivity of said start valve and stop valve, and means controlled by the conductivity of said stop valve for momentarily interrupting current flow in the control circuit.

JULIUS L. SOLOMON.

REFERENCES CITED

The following references are of record in the file of this patent:

UNITED STATES PATENTS

| Number | Name | Date |
| --- | --- | --- |
| 2,207,571 | Andrews | July 9, 1940 |
| 2,264,175 | Dawson | Nov. 25, 1941 |
| 2,370,727 | Holder | Mar. 6, 1945 |
| 2,372,129 | Smith | Mar. 20, 1945 |
| 2,405,597 | Miller | Aug. 13, 1946 |
| 2,435,207 | Dimond | Feb. 3, 1948 |
| 2,458,283 | McCreary | Jan. 4, 1949 |
| 2,469,934 | Solomon | May 10, 1949 |